United States Patent [19]

Li et al.

[11] Patent Number: 4,702,891

[45] Date of Patent: Oct. 27, 1987

[54] FLUID FLOW DISTRIBUTION SYSTEM FOR FLUIDIZED BED REACTOR

[75] Inventors: Allen S. Li, Morristown; Richard M. Eccles, Princeton, both of N.J.

[73] Assignee: HRI, Inc., Lawrenceville, N.J.

[21] Appl. No.: 730,253

[22] Filed: May 3, 1985

Related U.S. Application Data

[63] Continuation of Ser. No. 416,428, Sep. 9, 1982, abandoned.

[51] Int. Cl.$^4$ .............................................. B01J 8/20
[52] U.S. Cl. .................................... 422/140; 422/143; 422/145; 422/176; 422/220; 422/311
[58] Field of Search ............... 422/140, 143, 145, 176, 422/220, 311

[56] References Cited

U.S. PATENT DOCUMENTS

| | | | |
|---|---|---|---|
| 2,559,876 | 7/1951 | Hoekstra | 422/145 |
| 2,608,474 | 8/1952 | Gilliam | 422/143 |
| 2,862,798 | 12/1958 | McKinney | 422/145 X |
| 2,996,361 | 8/1961 | Brumbaugh | 422/220 |
| 3,414,386 | 12/1968 | Mattix | 422/140 X |
| 3,523,763 | 8/1970 | Van Driesen et al. | 422/145 |
| 3,560,167 | 2/1971 | Bruckner et al. | 422/220 |
| 3,698,876 | 10/1972 | Oregol et al. | 422/140 X |
| 4,221,653 | 9/1980 | Chervenak et al. | 422/140 X |
| 4,359,326 | 11/1982 | Hoffert et al. | 422/143 X |

FOREIGN PATENT DOCUMENTS

| | | | |
|---|---|---|---|
| 197809 | 9/1978 | Fed. Rep. of Germany | 422/140 |
| 0036993 | 11/1979 | Japan | 422/220 |

Primary Examiner—Barry S. Richman
Assistant Examiner—William R. Johnson
Attorney, Agent, or Firm—Fred A. Wilson

[57] ABSTRACT

An improved flow distribution system for a catalytic reactor plenum chamber for a gas-liquid-solids ebullated bed reactor incudes a baffled nozzle device containing at least two baffle plates usually oriented substantially normal to the nozzle inlet flow direction for providing good mixing and uniform flow distribution of gas-liquid materials in the lower portion of the plenum, used in combination with distribution grid to effect a substantially uniform flow distribution of the gas/liquid mixture upwardly into the ebullated catalyst bed. A sparger can be provided in the plenum above the baffled flow distributor device for feeding additional gas-liquid mixture into the reactor. The flow distribution system provides a substantially uniform flow distribution of the gas-liquid mixture into the ebullated bed and thereby provides fouling-free operation of the reactor.

13 Claims, 4 Drawing Figures

FLUID FLOW DISTRIBUTION SYSTEM FOR FLUIDIZED BED REACTOR

This application is a continuation of application Ser. No. 416,428, filed 9/9/82, now abandoned.

BACKGROUND OF THE INVENTION

This invention pertains to a fluid flow distributor device and system for introducing feed and recycle fluid streams uniformly into a plenum and an ebullated catalyst bed of a reactor. It pertains particularly to such a flow distribution system for handling petroleum and coal-oil slurry and gas streams for providing substantially uniform flow distribution upwardly into an ebullated catalyst bed in a reactor.

Experience in operating pilot plant and commercial ebullated bed catalytic reactors used in H-Oil® and H-Coal TM processes has shown that improper design of the inlet flow distribution in the reactor plenum can cause operational difficulties, such as coke formation in the plenum, flow maldistribution in the catalyst bed, localized catalyst bed slumping, and formation of coke in the bed. These problems have reduced catalyst utilization, and resulted in frequent reactor shutdowns and shortened periods of normal operation.

The prior art has apparently not provided an adequate solution to this flow distribution problem in fluidized bed catalytic reactors. For example, U.S. Pat. No. 3,197,288 to Johanson shows a catalytic reactor configuration using simple conduits for introducing the inlet feed and recycle liquid into the reactor plenum chamber, and U.S. Pat. No. 3,202,603 to Keith, et al, shows use of dual spargers in the lower end of a reactor. Also, U.S. Pat. No. 3,540,995 to Wolk, et al generally discloses operation of a coal hydrogenation process using an ebullated catalyst bed reactor in which feed and recycle liquid streams are introduced into the reactor lower end plenum below a flow distribution grid means. However, introducing such gas and liquid streams into a reactor plenum at high velocity requires more specific arrangements for the streams to achieve adequate mixing and uniform flow distribution. For this reason, improved designs of flow distributor devices to provide desirably uniform flow patterns in the reactor plenum and upwardly through the distribution grid means into the catalyst bed have now been developed.

SUMMARY OF THE INVENTION

The present invention provides a fluid flow distributor device and flow distribution system for feeding hydrocarbon liquids or slurries and a gas uniformly into the plenum chamber and ebullated catalyst bed of a reactor. The invention comprises a flow distributor device for providing flow distribtuion of a liquid/gas mixture into an ebullated bed reactor, the flow distributor device being located in a plenum of the reactor, said plenum being formed by a distribution grid and the lower end and lower walls of the reactor below the grid. The flow distributor device comprises a baffled nozzle positioned at the inner end of a conduit entering the plenum for recycling a hydrocarbon fluid at least partially derived from a reaction within the ebullated bed, said baffled nozzle being directed upwardly and having at least two baffles spaced apart from each other and rigidly attached to the inner end of said conduit, the innermost baffle consisting of a solid plate, and at least one other baffle having a central opening and located upstream of the solid plate baffle, whereby said baffled nozzle mixes a gas and a liquid material fed through said conduit into said plenum, and is arranged in combination with said distribution grid to effect a substantially uniform flow distribution of the gas/liquid mixture upwardly into the ebullated bed.

This invention also comprises a flow distribution system for providing a uniform flow distribution of a fluid material into an ebullated bed of a reactor, said distribution system comprising a plenum provided in the lower part of the reactor and formed by the reactor lower end and side walls and by a distribution grid located below the ebullated bed in the reactor, a conduit extending into said plenum for carrying a flowable fluid material into the plenum; and a baffled nozzle rigidly attached to the inner end of said conduit, said baffled nozzle being directed upwardly and having at least two baffles spaced apart from each other, the innermost baffle consisting of a solid plate, and at least one other baffle having a central opening and located upstream of the solid plate baffle, whereby said baffled nozzle mixes a gas and a liquid material fed through said conduit into said plenum and is arranged in combination with said distribution grid to effect a substantially uniform flow distribution of the gas/liquid mixture into said ebullated bed.

This invention is particularly useful and advantegeous for handling hydrocarbon feedstreams such as petroleum and coal slurries for uniform distribution together with hydrogen gas into an ebullated catalyst bed reactor. Accordingly, the term gas/liquid mixture is understood to include also gas/liquid slurry mixture containing fine particulate solids.

DESCRIPTION OF INVENTION

In the present invention, the fluid stream such as a mixture of coal-derived liquid slurry and hydrogen is passed through a conduit and a disc-donut type baffled nozzle distributor device into a plenum located at the lower end of a reactor. The distributor device usually contains a series of substantially parallel spaced-apart baffle plates located at an angle of 45°–90° to the centerline of the conduit inner end, which device provides lateral or radially outward flow deflection within the plenum. Also, the central axis of the baffled nozzle distributor device is located at an angle of 0°–60° with the centerline of the plenum and reactor vessel. The baffled inlet flow distributor device for the reactor plenum of gas-liquid-solids fluidized bed reactors provides a fouling-free distributor device for dispersion of the kinetic energy of the flowing fluids fed into the plenum chamber. The distributor device prevents "jetting" of the recycle liquid and gas stream in the plenum, and disperses the liquid flow uniformly in the plenum.

Depending on the reactor operating conditions and the space available in the plenum, the flow distributor device can have various configurations. The liquid flow distributor device can consist of at least two preferably circular baffle plates located at the outlet of the recycle liquid conduit entering the plenum. For a central vertical nozzle location within the plenum, these baffle plates are usually equally spaced from each other. The distributor device innermost or top plate is solid, and deflects the inlet flow laterally to prevent direct impingement of liquid on the lower surface of the grid plate. The other baffle or dispersion plates in the device have central openings sized to intercept and deflect portions of the liquid flow laterally or radially outwardly into the plenum. The flow paths of these lateral streams are directed to sweep the plenum bottom to eliminate stagnation zones and provide good mixing of gas/liquid (or gas/liquid slurry) and substantially uniform flow upwardly through openings in the flow distribution grid into the ebullated catalyst bed.

The percent of total material flowing radially outwardly from the space between adjacent baffle plates can be varied by selecting the dimensions of the distributor device, but usually a greater percentage of the total flow is emitted from the lowest space. In a typical deflector device design, about 40-45% of the inlet liquid flow is deflected by the first or upstream plate, 25-35% is deflected by the middle plate, and the remaining flow is deflected radially outwardly by the top or innermost plate. For a nozzle configuration entering the plenum from one side, the baffle plates are usually oriented at an angle varying from about 0° to about 10° with the adjacent baffle plate to provide a uniform dispersion of the recycle gas/liquid flow within the plenum.

Figure 1:
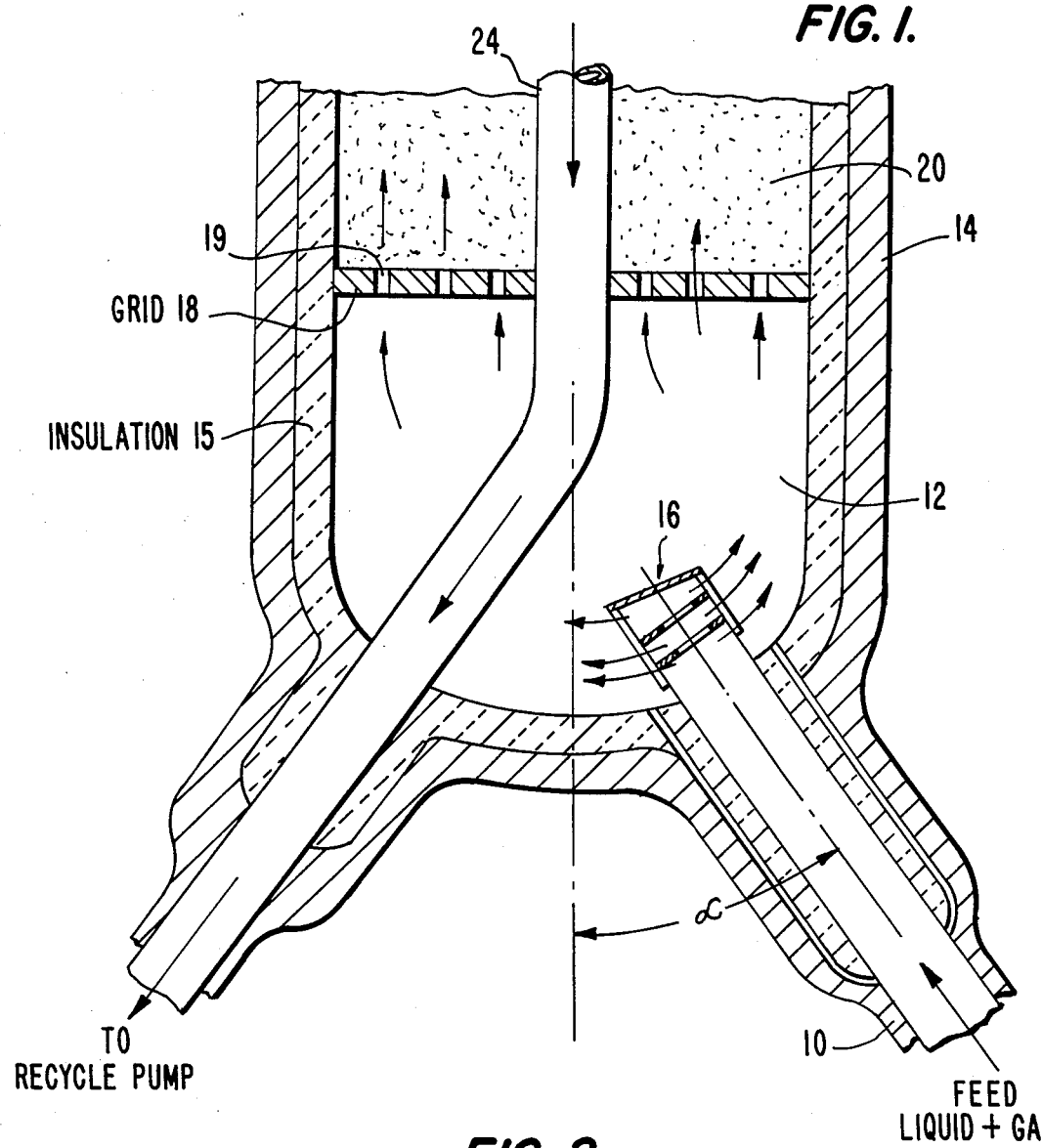
FIG. 1 is a vertical cross-sectional view of the lower portion of an ebullated bed reactor utilizing the invention.

For small diameter reactors having inside diameters less than about 5 feet, it is usually more convenient to mix the feed liquid and gas streams with the reactor recycle liquid external to the reactor prior to uniformly distributing the combined mixture in the reactor plenum, utilizing the distributor device of FIG. 1 as described below. For reactors having diameters larger than about 6 ft., it is usually desirable to introduce the feed liquid and gas mixture into the reactor plenum through separae distributor devices. For example, a circular perforated sparger ring is usually located in the plenum upper portion and can be used to distribute the gas-liquid feed mixture uniformly across the reactor plenum. Uniform flow of small bubbles and liquid feed is produced by providing a pressure drop across the sparger and directing the mixed gas-liquid streams from the sparger downwardly to substantially dissipate the stream kinetic energy in the liquid. This kinetic energy is utilized to increase the intensity of liquid backmixing in the plenum. Pressure drops across the sparger ring openings usually range from 1-15 psi for typical heavy petroleum crude upgrading and coal liquefaction processes.

In an alternative embodiment of the invention, the downcomer conduit for the reactor recycle liquid can pass through the center of the baffled distributor device, which preferably consists of three baffle plates. The recycled reactor liquid enters the reactor plenum through an annular area between the liquid downcomer conduit and the inlet nozzle. The central openings of the first and middle baffle plates are sized to disperse the liquid flow laterally and uniformly radially outward across the reactor plenum, and to sweep the plenum bottom to eliminate any stagnant zones. The top solid baffle plate prevents direct impingement of liquid on the bottom side of the distribution grid.

This inlet flow baffled nozzle distributor device is used upstream and in combination with the reactor distribution grid to provide an improved flow distribution system for an ebullated catalyst bed reactor. The pressure drop across the baffled nozzle distributor device at rated flow is usually about 5-25% of the total pressure drop across both the distributor device and the distribution grid. Although the distribution grid can consist of a perforated plate, it preferably contains multiple tubes each provided with a cap over the tube upper end. This distribution system provides improved gas-liquid contacting and gas mixing in the reactor plenum, eliminates undesired direct impingement of the fluid streams on the distribution grid, and minimizes coke formation in the plenum and in the catalyst bed.

The invention will be further described with reference to FIG. 1, which shows an inlet conduit 10 inserted into a plenum chamber 12 of reactor 14, which may be lined with refractory insulation 15. The conduit has a baffled nozzle or disc-donut flow distributor device 16 oriented generally upwardly therein for feeding a liquid and gas mixture into the plenum, then uniformly upwardly through openings 19 in flow distribution grid 18 into ebullated catalyst bed 20. Reactor liquid is withdrawn from above the catalyst bed downward through central conduit 24 to a recycle pump (not shown) from which the liquid is recycled together with fresh liquid and gas feed through inlet pipe 10 to flow distributor 16. The plenum 12 preferably has a height equal to 5-10 times the inner diameter of conduit 10, and distribution grid 18 preferably has a diameter equal to 4-12 times the inner diameter of conduit 10. The flow distributor device 16 perferable extends into the plenum 12 so as to be spaced below the flow distribution grid plate 18 by a distance equal to about 2.5-9 times the inner diameter of the inlet conduit 10.

Figure 2:
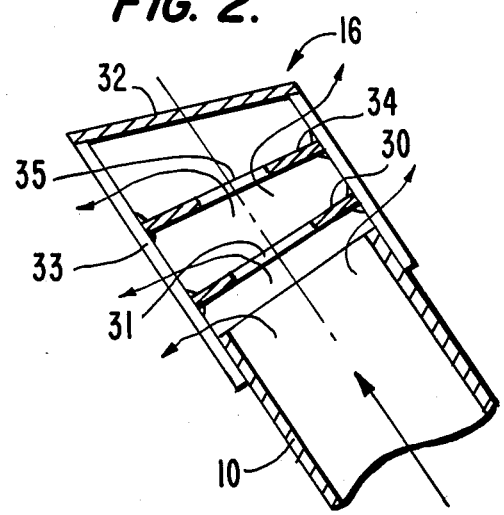
FIG. 2 is a vertical cross-sectional view of a baffled nozzle flow distributor device used in the invention.

As shown in greater detail in FIG. 2, the flow distributor device 16 comprises at least one annular-shaped plate 30 having central opening 31 located upstream of circular solid plate 32, and all retained together by three circumferentially equally-spaced structural rods 33, which are preferably located at the baffle plate outer edges. Usually, one additional annular-shaped plate 34, having progressively smaller central opening 35 is located intermediate plates 30 and 32 to provide a preferred distributor device configuration for further radial distribution of the flow from conduit 10. Thus as shown in FIG. 2, the solid baffle 32 is designated the downstream or innermost baffle, annular-shape plate 30 is designated the upstream baffle, and annular-shaped plate 34 is designated the intermediate baffle. The central opening 31 of upstream baffle 30 has a diameter of 0.6-0.75 times the inner diameter of conduit 10, and the central opening 35 of intermediate baffle 34 has a diameter of 0.3-0.5 times the inner diameter of conduit 10. The three baffle plates, i.e., upstream baffle 30, downstream solid baffle 32, and intermediate baffle 34, are spaced apart from each other by distance equal to 0.3-0.5 times the inner diameter of conduit 10. The greater percentage of flow should preferably be emitted from the lowest space, because of its greater distance for fluid travel in plenum 12 before reaching distribution grid 18. For a preferred flow distributor device having three plates, the plate dimensions are preferably selected such that about 40-45 volume percent of the fluid flow is deflected radially outwardly by the first or upstream baffle 30, about 25-35 volume percent is deflected outwardly by the second or intermediate baffle 34, and the remaining flow radially deflected by solid top or downstream plate 32.

The three spaced-apart baffle plates are located at an angle of 45°-90° with the centerline of the inner end of the conduit 10. Also the baffled nozzle axis is located at an angle α of 0°-60° with the centerline of the plenum 12 and the reactor 14. Furthermore, if desired, each baffle plate can be oriented at an angle of 0°-10° with the adjacent baffle plate to provide a uniform dispersion of the gas/liquid mixture within the plenum 12.

Figure 3:
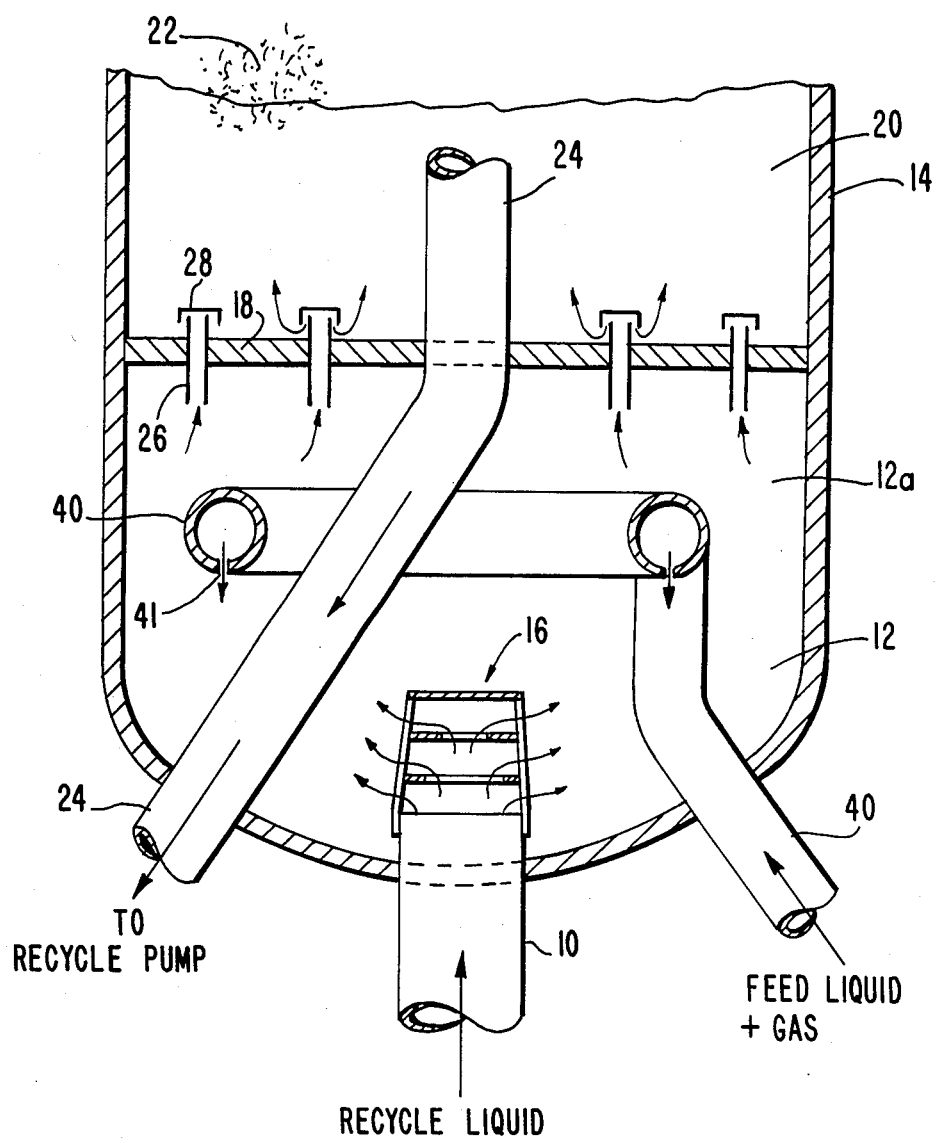
FIG. 3 shows an alternative embodiment of the invention in which the feed and recycle streams are introduced into the reactor plenum through separate flow devices.

FIG. 3 shows an alternative configuration of the fluid flow distribution system of this invention, wherein the flow distributor device 16 is centrally located in the bottom of plenum chamber 12 below distribution grid 18, and extends above the bottom of the plenum by a distance equal to 1.0-2.5 times the inside diameter of the inlet conduit. The flow distribution grid 18 preferably contains multiple vertical tubes 26 having inner diameter of 0.75-1.5 inches and which tubes each extend below the grid by a distance equal to 4-10 times the tube inner diameter. Tubes 26 extend above the grid by a distance equal to about 1.5-24 times the tube inner diameter. Above the upper end of each tube 26, a cylindrical-shaped cap 28 is provided which is spaced away from the tube and is rigidly supported from the tube by suitable structural members (not shown). Cap 28 is oriented so as to prevent entry of catalyst solid particles 22 from the ebullated bed 20 into tubes 26 whenever there is no upward fluid flow through the tube, such as may occur during operational upsets or occurs at process shutdown. A circular sparger ring 40 having uniformly spaced openings 41 on its lower side is provided above flow distributor device 16 to uniformly distribute gas and liquid flow in the upper portion 12a of the plenum chamber. The sparger 40 encircles downcomer conduit 24, and is particularly useful for large diameter reactors, such as exceeding about 8 feet inside diameter. The openings 41 are each sized to provide a uniform pressure drop and are located to direct to flow downwardly so as to substantially dissipate its kinetic energy and increase the back-mixing action of gas and liquid in the plenum 12.

Figure 4:
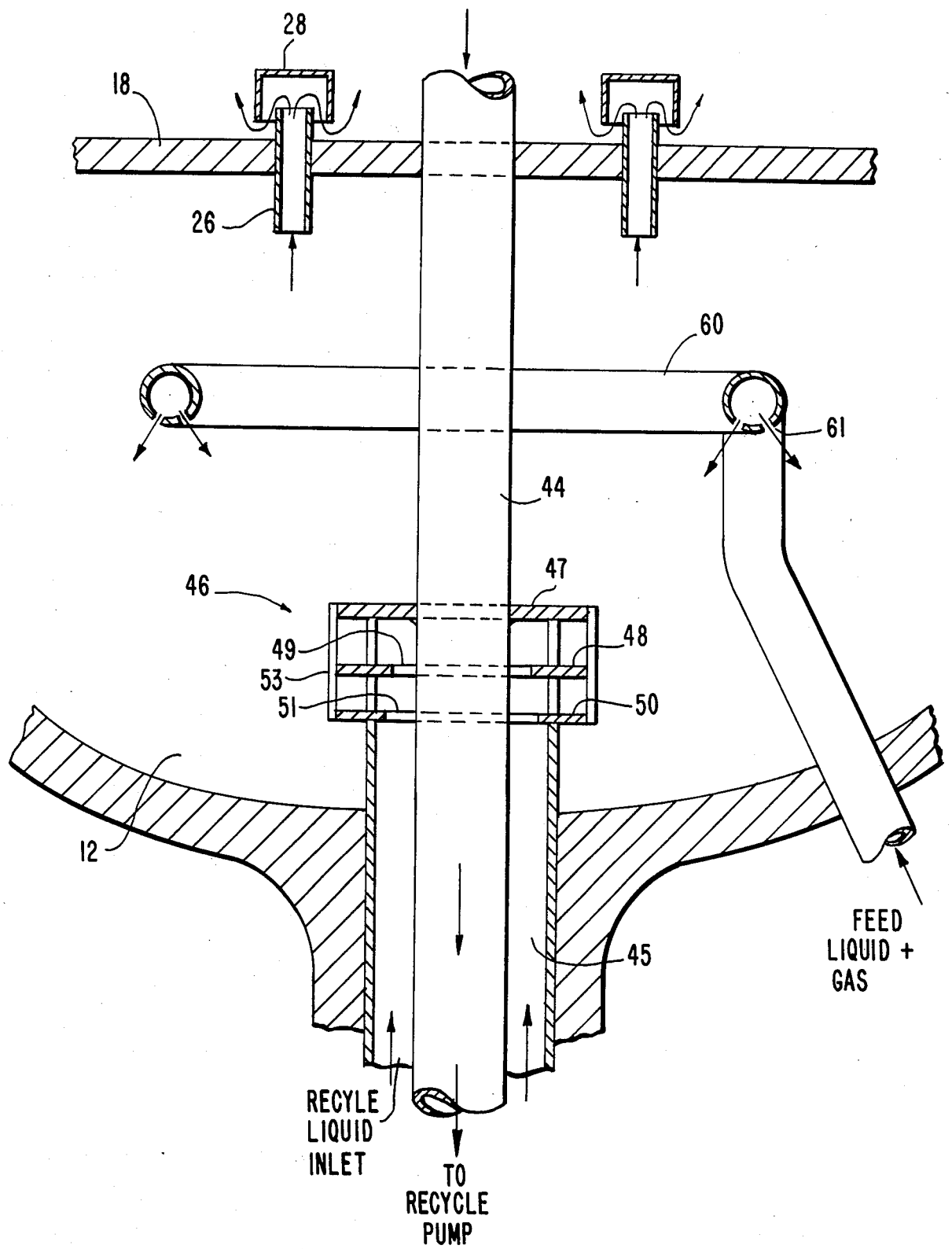
FIG. 4 shows another embodiment of the invention similar to FIG. 3.

In another embodiment of the invention as shown by FIG. 4, downcomer conduit 44 passes through the center of baffled flow distributor device 46. The distributor device consists of three annular-shaped plates supported from conduit 44 and to which upward fluid flow is provided by annular conduit 45. Upper solid plate 47 is rigidly attached as by welding to conduit 44 and located substantially perpendicular to conduit 44. Intermediate plate 48 is attached to plate 47 by three equally-spaced rods 53 and has an annular opening 49. Lower plate 50 has annular opening 51 somewhat larger than the opening 49 in intermediate plate 48. Thus, flow distributor device 46 operates similarly as for distributor device 16, whereby a portion of the total upward fluid flow passes radially outwardly through the spaces between the adjacent plates. Circular sparger 60 having a plurality of uniformaly spaced openings on its lower side is also provided in plenum chamber 12 and is centrally located above flow distribution device 46, similarly as in sparger 40 for the FIG. 3 configuration.

The effectiveness of using the inlet flow distributor device and system configuration is illustrated by the following examples, which should not be regarded as limiting the scope of the invention.

EXAMPLES

In a coal hydrogenation plant using the H-Coal TM Process for coal liquefaction and having an ebullated bed catalyst reactor with 5 ft. inside diameter, (200 tons/day H-Coal Pilot Plant Reactor), the feed coal slurry and hydrogen gas was mixed with the recycle ebullation liquid flow external to the reactor. The total combined stream was then distributed through a side-entering nozzle equipped with three inclined baffle plates, as described for the FIG. 1 embodiment of this invention. Following installation of the distributor nozzle in the reactor plenum, coking in the reactor ebullated catalyst bed due to flow maldistribution therein was substantially eliminated.

In a commercial H-Coal (18,000 tons/day) Plant reactor design, having 11 ft inside diameter, the plenum contains a side-entering nozzle equipped with three inclined baffle plates for dispersion of the recycle liquid slurry flow and a circular sparger ring for distributing the feed liquid slurry and gas. In a commercial H-Oil ® (35,000 bbl/day) Plant reactor design having 10 ft. inside diameter, the inlet flow distribution system in the reactor plenum consists of a vertical nozzle equipped with three horizontal plates for dispersion of the recycle ebullating liquid flow and a sparger ring for distribution of the feedstream liquid and gas.

Although this invention has been described broadly and in terms of various specific embodiments, it will be understood that modifications and variations can be made and some elements used without others all within the spirit and scope of the invention, which is defined by the following claims.

I claim:

1. A system for providing a uniform flow distribution of a fluid material upwardly into an ebullated bed of a reactor, said system comprising:
   (a) a reactor vessel having at least one side wall and a lower end,
   (b) a plenum provided in a lower part of the reactor and defined by the reactor lower end, the at least one side wall and by a distribution grid located below and supporting an ebullated bed in the reactor, said distribution grid containing a plurality of vertical tubes each having an upper end which is covered by a cap for upward fluid flow uniformally therethrough into the ebullated bed;
   (c) a conduit having a first end which extends upwardly into said plenum for carrying a flowable fluid material into the plenum, said conduit having an inner diameter; and
   (d) a baffled nozzle rigidly attached to the first end of said conduit, said baffled nozzle being directed upwardly and extending into said plenum so as to be spaced below said distribution grid by a distance equal to 2.5-9 times the inner diameter of said conduit; said baffled nozzle having at least two baffles spaced apart from each other, a downstream innermost baffle consisting of a solid plate, and at least one upstream baffle, each of said upstream baffles having a central opening smaller than said conduit and being located upstream of the downstream baffle, whereby said baffled nozzle mixes a gas and a liquid material fed through said conduit into said plenum and is arranged in combination with said distribution grid to effect a substantially uniform mixing and flow distribution of the gas/liquid mixture upwardly into said ebullated bed.

2. the flow distribution system of claim 1, wherein the fluid pressure drop across said baffle nozzle is 5-25% of the total fluid pressure drop across the baffled nozzle and said distribution grid.

3. The system of claim 1, wherein the spaced-apart baffles are oriented at an angle of 45°-90° with respect to the centerline of the first end of said conduit.

4. The system of claim 1, wherein the longitudinal axis of said baffled nozzle is located at an angle of 0°-60° with respect to the centerline of said plenum and said reactor.

5. The system of claim 1, wherein each of said baffle plates are spaced apart from each other by a distance equal to 0.3-0.5 times the conduit inner diameter.

6. The system of claim 1, wherein an annulus-shaped sparger is provided in said plenum below said distribution grid and above said baffled nozzle.

7. The system of claim 1, wherein said baffled nozzle extends above the bottom of the reactor plenum by a distance equal to 1.0-2.5 times the inside diameter of said conduit.

8. The system of claim 1, wherein said plenum has a height equal to 5-10 times the inside diameter of said conduit.

9. The system of claim 1, wherein said distributionn grid has a diameter equal to 4-12 times the inside diameter of said conduit.

10. The system of claim 1 wherein said baffled nozzle consists of three circular baffle plates, a first lower upstream baffle plate having a first central opening, a second intermediate baffle plate having a second central opening therein smaller than that of said first opening, and said downstream innermost baffle.

11. The system of claim 1 wherein said first central opening has a diameter 0.6-0.75 times the conduit inner diameter, and said second central opening has a diameter 0.4-0.5 times the conduit inner diameter.

12. A system for providing a uniform flow distribution of a fluid material upwardly into an ebullated bed of a reactor, said system comprising:
(a) a reactor vessel having at least one side wall and a lower end,
(b) a plenum provided in a lower part of the reactor and defined by the reactor lower end, and at least one side wall and by a distribution grid located below and supporting an ebullated bed in the reactor, said distribution grid containing a plurality of vertical tubes each having an upper end which is covered by a cap for upward flow of fluid uniformally therethrough;
(c) a downcomer conduit passing vertically through said distribution grid and plenum for recycling a fluid from said ebullated bed of said reactor;
(d) an inlet conduit having an inner end which extends upwardly into said plenum for carry a flowable fluid material into the plenum; and
(e) a baffled nozzle rigidly attached to the inlet conduit inner end which is directed upwardly in the plenum, said baffled nozzle extending into said plenum so as to be spaced below said distribution grid by a distance equal to about 2.5-9 times the inner diameter of said conduit, said baffled nozzle having at least two baffles spaced apart from each other, a first downstream innermost baffle consisting of a solid plate, and at least one second baffle having a central opening and located upstream of the solid plate baffle, whereby said baffled nozzle mixes a gas and a liquid material fed through said inlet conduit into said plenum and is arranged in combination with said distribution grid to effect a substantially uniform mixing and flow distribution of the gas/liquid mixture upwardly into said ebullated bed.

13. The system of claim 12, wherein said downcomer conduit is centrally located in said plenum and passes vertically through said grid and plenum, and wherein said baffled nozzle is located external to and concentric with the downcomer conduit.

* * * * *